July 26, 1938.  A. H. GOLDSWORTHY  2,124,526
DIAPHRAGM CLOSURE FOR BEARINGS
Filed April 22, 1937
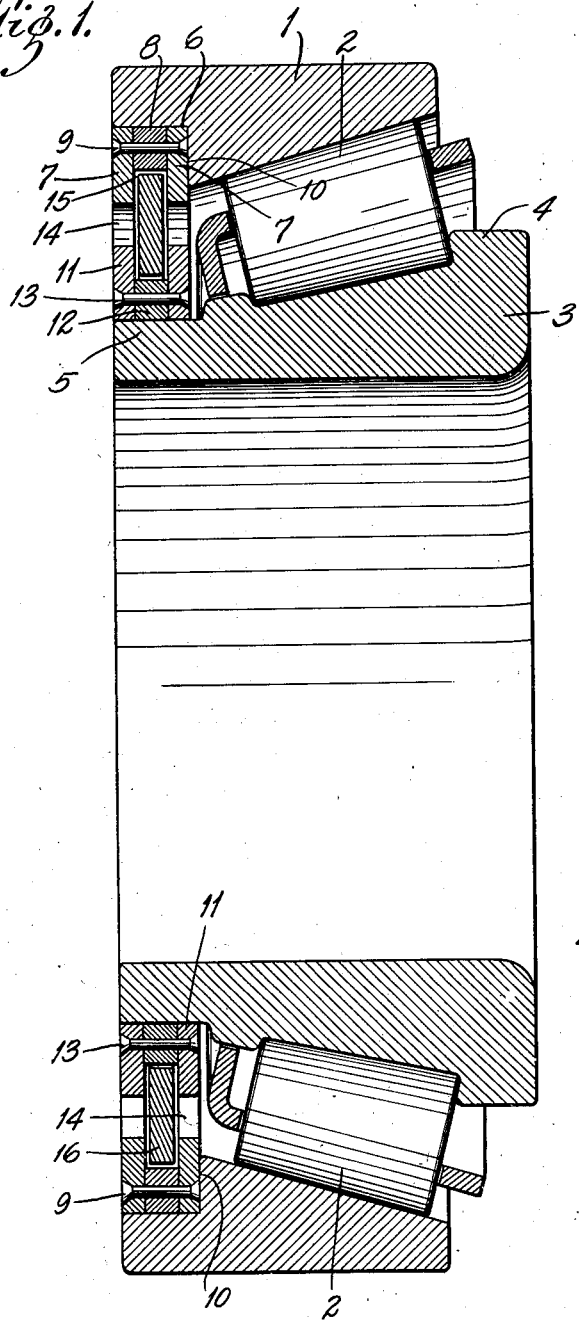
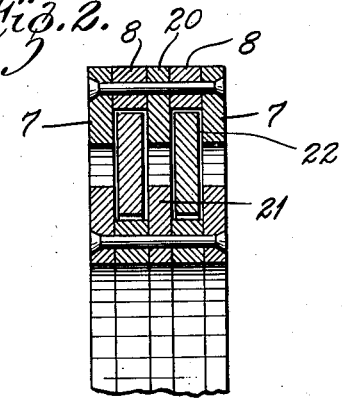
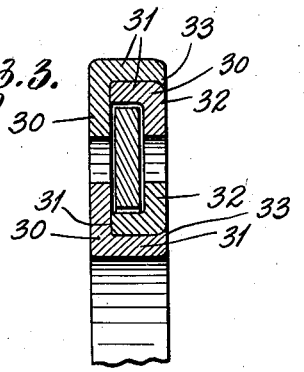
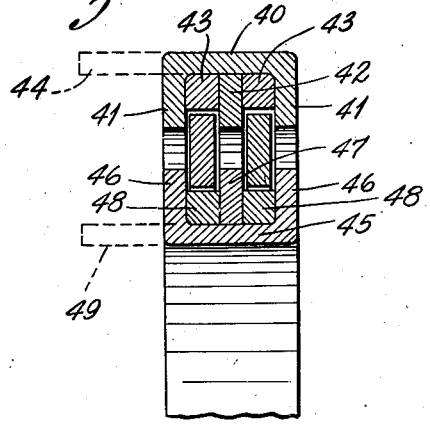
INVENTOR:
Albert H. Goldsworthy
HIS ATTORNEYS Patented July 26, 1938

2,124,526

UNITED STATES PATENT OFFICE 2,124,526

DIAPHRAGM CLOSURE FOR BEARINGS

Albert H. Goldsworthy, Canton, Ohio, assignor to The Timken Roller Bearing Company, Canton, Ohio, a corporation of Ohio Application April 22, 1937, Serial No. 138,291

5 Claims. (Cl. 288—1)

My invention relates to a closure for the end of a roller bearing and has for its principal object a closure which is effective but of simple construction and which can be used to make a self-contained assembly of the bearing.

The invention consists principally in a closure having spaced outer cover rings and spaced inner cover rings arranged in alinement with each other and an annular washer or diaphragm bridging the gap between two sets of cover rings and with its ends held between the cover rings of the respective sets. The invention further consists in the bearing closure and in the parts and combinations and arrangements of parts hereinafter described and claimed.

In the accompanying drawing,

Fig. 1 is a sectional view of a bearing and of a closure therefor embodying my invention;

Fig. 2 is a sectional view of a modified closure;

Fig. 3 is a sectional view of another modification; and

Fig. 4 is a view of another modification.

In Fig. 1 is illustrated a taper roller bearing including a cup 1 or outer bearing member, conical rollers 2 and a cone 3 or inner bearing member having a thrust rib 4 for the rollers at its large end and having a cylindrical portion 5 extending beyond the small end of the raceway.

The cup has a rabbeted portion 6 in the end opposed to the cylindrical portion 5 of said cone. Mounted in said rabbet 6 are radially disposed flat outer cover rings 7 or washers having a spacer ring 8 therebetween, the ring assembly being held together by means of rivets 9. The innermost outer cover ring 7 abuts against the shoulder 10 formed by the rabbet 6 and the outermost outer cover ring 7 is flush with the edge of the cup 1. The spacer ring 8 is relatively narrow and disposed between the outer portions of the cover rings 7.

Mounted on the cylindrical portion 5 of the bearing cone 3 are flat inner cover rings 11 or washers and a spacer ring 12 therebetween, the ring assembly being held together by means of rivets 13. The inner cover rings 11 are in alinement with the respective outer cover rings 7, there being an annular gap 14 between the outer peripheries of the inner cover rings and the inner peripheries of the outer cover rings. Disposed in the annular chamber 15 formed by the outer cover rings 7, the inner cover rings 11, the outer spacer ring 8 and the inner spacer ring 12, is an annular diaphragm 16 or washer. This diaphragm 16 is of a size to fit loosely in said chamber so as to accommodate irregularities of manufacture and variations in the sizes of parts.

In the construction shown in Fig. 2, there is a center ring 20 of the same construction as the outer cover rings 7, spacer rings 8 on either side of said center rings spacing it from the outer cover rings. Similarly there is an inner center ring 21 in the inner ring assembly in alinement with the outer center ring 20. There is thus provided a second annular chamber 22 in which a second diaphragm 23 is mounted.

In the construction shown in Fig. 3, the spacer rings are eliminated, the cover rings 30 being of angular section with nested peripheral portions 31 and radial flanges 32. The overlapping edge portions 33 of the peripheral flange portions of the cover rings are spun over the inside rings to hold the parts in assembly.

The modification shown in Fig. 4 includes an outer cover 40 having radial flanges 41 at its ends, a center ring 42 mounted therein and spacer rings 43 holding the center ring 42 in position. The outer cover ring initially has a radial flange at one end only, a projecting cylindrical portion 44 indicated in dotted lines being spun over after the center ring and spacer rings have been mounted to form the second radial flange.

The inner member of the closure likewise includes an inner cover 45 having radial end flanges 46, a center ring 47 mounted in said inner cover and spacer rings 48 on either side of said center rings. One flange of said inner cover 45 is formed by spinning over a cylindrical portion 49, shown in dotted lines, after the parts have been assembled.

The above described closures make of the bearing a self-contained unit. The closure is simple in construction, can be made cheaply of stamped parts and forms a very effective seal. Obviously numerous changes may be made without departing from the invention and I do not wish to be limited to the precise construction shown.

What I claim is:

1. A bearing closure comprising outer spaced radial cover rings, securing means therefor, inner spaced radial cover rings in alinement with the respective outer cover rings and spaced radially therefrom, securing means for said inner rings, and a floating diaphragm bridging the gap between the inner and outer sets of cover rings, with its outer peripheral portion disposed between the outer cover rings and its inner peripheral portion disposed between the inner cover rings.

2. A bearing closure comprising outer spaced radial cover rings, a spacer ring therebetween, rivets securing said cover rings and spacer rings together, inner spaced radial cover rings in alinement with the respective outer cover rings and spaced radially therefrom, a spacer ring between said inner cover rings, rivets securing said inner cover rings and spacer rings together, and a floating diaphragm bridging the gap between the inner and outer sets of cover rings, with its outer peripheral portion disposed between the outer cover rings and its inner peripheral portion disposed between the inner cover rings.

3. A bearing closure comprising a plurality of outer spaced radial cover rings, spacer rings between adjacent cover rings, rivets securing the ring assembly together, a plurality of inner spaced radial cover rings in alinement with the respective outer cover rings and spaced radially therefrom, spacer rings between adjacent inner cover rings, rivets securing said inner ring assembly together, and floating diaphragms bridging the gap between the inner and outer sets of cover rings, with their outer peripheral portions disposed between outer cover rings and their inner peripheral portions disposed between inner cover rings.

4. A bearing closure comprising a pair of angular outer cover rings having their peripheral portions nested and their radial flanges spaced apart, a pair of angular inner cover rings having their peripheral portions nested and their radial flanges spaced apart and radially alined with the radial flanges of said outer cover rings and an annular floating diaphragm bridging the gap between inner and outer cover rings, its outer periphery being disposed between said outer cover rings and its inner periphery between said inner cover rings.

5. A bearing closure comprising an outer cover having a cylindrical body and radial end flanges, a center ring in said body, spacer rings between said center rings and the inner faces of said end flanges, an inner cover having a cylindrical body and radial end flanges alined with said end flanges of said outer cover, a center ring in said inner cover body, spacer rings between said inner center ring and the end flanges of said inner cover and annular diaphragms in the chambers formed by said center rings and the respective end flanges and spacer rings.

ALBERT H. GOLDSWORTHY.